United States Patent [19]
Cenci

[11] 3,716,524
[45] Feb. 13, 1973

[54] T-BUTYL ALCOHOL/WATER COSOLVENT EMULSION COPOLYMERIZATION OF A MONOMERIC SYSTEM COMPRISING METHYL METHACRYLATE AND BICYCLIC METHACRYLATE

[75] Inventor: Harry J. Cenci, Warminster, Pa.
[73] Assignee: Rohm and Haas Company, Philadelphia, Pa.
[22] Filed: Jan. 6, 1971
[21] Appl. No.: 104,519

[52] U.S. Cl. ............260/78.5, 204/159.22, 260/79.7, 260/80.73, 260/80.8, 260/80.81, 260/86.1 E, 260/89.9
[51] Int. Cl. .............................................C08f 15/16
[58] Field of Search ....260/86.1 E, 80.81, 79.7, 78.5, 260/80.73, 80.8

[56] References Cited

UNITED STATES PATENTS 3,485,775  12/1969  Cenci et al. .........................260/80.81
3,536,788  10/1970  Hurwitz et al.....................260/86.1 E

OTHER PUBLICATIONS

Guha, Chem. Abs. 60 (1964) pp. 14,616b
Chem. Abs. 72 (1970) pp. 32,660t

*Primary Examiner*—Harry Wong, Jr.
*Attorney*—George W. F. Simmons and Carl A. Castellan

[57] ABSTRACT

A mixture comprising a bicyclic methacrylate, methyl methacrylate, up to 10 percent by weight of ethyl acrylate, an aqueous medium containing an organic solvent that is substantially inert, such as t-butyl alcohol, is polymerized in emulsion to give a product which contains a low level of coagulum and of residual monomer.

10 Claims, No Drawings

T-BUTYL ALCOHOL/WATER COSOLVENT EMULSION COPOLYMERIZATION OF A MONOMERIC SYSTEM COMPRISING METHYL METHACRYLATE AND BICYCLIC METHACRYLATE

This invention pertains to a novel and improved process for the copolymerization of bicyclic methacrylates and methyl methacrylate characterized by a high level of efficiency during the process and homogeneity of the resulting polymer, with the use of only small amounts of emulsifier.

Heretofore, bicyclic methacrylates have been copolymerized by conventional processes of bulk, solution and aqueous emulsion types. The emulsion polymerization processes have several substantial disadvantages. Usually the accompanying coagulum or "gum" production is of such a high proportion that serious practical difficulties are encountered in operating the equipment. The gum tends to stick to the agitating apparatus, interferes with the continuity of the process, and may require removal from the product as by a step of filtration. Heretofore, the amounts of coagula could be kept at a minimum only by the use of excessively large amounts of emulsifying agents. In addition, these processes are inefficient since a high proportion of monomers remains unreacted. It has proven difficult to restrict these residual monomers to a commercially acceptable level. Furthermore, a few of the conventional methods were effective in limiting the drift in polymer composition during polymerization.

It has now been discovered that when a bicyclic methacrylate and methyl methacrylate with or without a small amount of one or more other monomers, such as ethyl acrylate, are copolymerized under certain conditions hereinafter specified, novel copolymers are obtained which are usually uniform and homogeneous. In addition, little gum build-up occurs during the formation of copolymers. A further unexpected advantage of the process is that essentially no compositional drift occurs during polymerization. Furthermore, the proportion of residual monomers has been found to be low and at a commercially acceptable level, with the use of only a small amount of emulsifier.

The method of this invention consists in polymerizing methyl methacrylate with a bicyclic methacrylate and optionally small amounts of other monomers emulsified in an aqueous system containing tert-butanol as a cosolvent. The bicyclic methacrylates with which the present invention is concerned are those which are water-insoluble but have some hydrophilicity such that they meet the following test: (1) a solution of one gram of the monomer in 80 grams of absolute methanol is prepared, and (2) a measured amount of water is cautiously added to this solution until an end point is indicated by the appearance of turbidity or phase separation. If turbidity or phase separation does not appear before 30 milliliters of water have been added, the monomer is satisfactory for polymerization by the present process. examples of bicyclic methacrylates that may be employed include isobornyl methacrylate (IBOMA); bornyl methacrylate (BOMA); fenchyl methacrylate (FEMA); 1,4,5,6,7,7-hexachlorobicyclo [2.2.1]-hept-5-ene-2-ol methacrylate (HCBOMA) and 1,4,5,6,7,7-hexachlorobicyclo [2.2.1]-hept-5-ene-2 - methanol methacrylate (HCBMA), which are known compounds and may be synthesized in known fashions.

The monomers of bicyclic methacrylate and methyl methacrylate may be present in the reaction mixture in any desired proportion relative to each other from about 30 to 70 parts by weight. Other monomers may be present in small amounts, such as up to 10 parts by weight. Examples of such other monomers include ($C_1$–$C_8$) alkyl acrylates or ($C_2$–$C_8$) alkyl methacrylates, a vinylaromatic monomer, such as styrene or vinyltoluene (o,m,p), acrylonitrile and so on. Lesser amounts up to 1 to 5 percent of ethylthioethyl methacrylate, acrylamide, methacrylamide, N-methylol-acrylamide, or an acid, such as acrylic acid, methacrylic acid, or itaconic acid may also be included. The desired composition will be governed by the properties required of the resulting copolymer. By using the organic cosolvent tert-butyl alcohol, it has been found that even when there is used only a relatively small amount, up to about 1 percent (based on monomer weight), of emulsifier, there is very low formation of gum. There is also obtained a product with low residual monomer and the copolymer composition is of greater uniformity than that obtained by prior art emulsion polymerization processes. The cosolvent should be present in an amount not less than 7 percent and no more than 25 percent by weight of the aqueous phase. Any greater concentration would not only be economically impractical but would also slow down the reaction and increase the amount of coagulum. The preferred proportion of tert-butanol is from about 7.5 to about 18 percent by weight, based on the aqueous phase.

Polymerization may be effected or accelerated by heat, ultraviolet light, or other radiation. However, it is preferred to employ a free radical initiator with or without a reducing agent at temperatures in the range of room temperature up to about 80° to 95° C. Examples of initiators that may be used include hydrogen peroxide, ammonium and alkali metal persulfates, tert-butyl hydroperoxide, and cumene hydroperoxide. The initiators may be used in the customary amounts, such as from about 0.1 to about 1 percent, based on the monomer weight, and also may be used in a redox system, formed by the addition of a reducing agent, such as an alkali metal hydrosulfite, metabisulfite, sodium formaldehyde sulfoxylate, isoascorbic acid, etc. The amount of reducing agent may be from 0.05 to 1 percent, based on monomer weight.

The emulsifier may be any water-miscible anionic or nonionic emulsifying agent. Examples of anionic emulsifiers are sodium or potassium lauryl sulfate, sodium or potassium alkylaryl sulfonates, alkali metal dioctyl sulfosuccinates or organic phosphates and the like. Examples of nonionic emulsifiers are nonyl- or t-octyl-phenoxypolyethoxyethanols having about 10 to 50 oxyethylene units. Optionally, a chain transfer agent, such as n-dodecyl mercaptan, may be included in an amount up to about 2 percent, preferably 0.25 to 1 percent, to limit the molecular weight of the resulting copolymer.

It was further discovered that by varying certain physical conditions during the practice of the invention, the levels of gum production and of residual monomers may sometimes be additionally affected.

Examples which are provided below are intended to be merely illustrative. All parts and ratios and percentages are by weight unless otherwise mentioned. The following abbreviations are used: MMA for methyl methacrylate, IBOMA for isobornyl methacrylate, and EA for ethyl acrylate.

EXAMPLE

There is charged to a glass reaction vessel equipped with a thermometer, reflux condenser, stirrer, and a nitrogen sparge tube; a mixture of 1,326 grams of distilled water, 16 grams of sodium lauryl sulfate, 234 grams of tert-butyl alcohol. The resulting solution is subjected to a nitrogen sparge at 88 ml./min. for 1 hour while stirring at the rate of 180 rpm, after which the following nitrogen-sparged monomer mix is added; 384 grams of methyl methacrylate, 16 grams of ethyl acrylate, 400 grams isobornyl methacrylate and 2.0 grams n-dodecyl mercaptan. While the nitrogen sparge is continued, the temperature is adjusted to 33° C., 3 ml. of 5 percent acetic acid and 1.20 grams of cumene hydroperoxide are added. 5 minutes later, 0.80 grams of sodium formaldehyde sulfoxylate in 25 ml. of deionized water is added. After 1 minute, the temperature of the exothermic reaction mixture reaches 38° C., and then 68° C. after 25 minutes. The emulsion is then cooled and filtered through a double layer of cheesecloth. Examination of the resulting copolymer shows 2 grams of wet coagulum and 0.45 percent of total residual monomer (based on polymer solids).

The lack of drift in the polymer composition during polymerization is determined by taking six samples from the polymer dispersion by use of a drain assembly in the reactor. The samples selected at certain times during the reaction are precipitated directly from methanol containing methyl hdyroquinone, dried in a vacuum oven, ground and dried again. The resulting polymers are pyrolyzed at a temperature of 640° C. using an Ashton pyrolyzer. The results of analysis of the samples indicate that no compositional drift had occurred in any of the six samples.

The polymerization products obtained when proceeding in the described manner may in general be used as coating materials with the use of plasticizers. If so desired, the t-butanol may be removed and when so removed, the copolymers serve very effectively as processing aids and modifiers for PVC molding compounds, i.e., of vinyl chloride homopolymers and copolymers containing at least 50 percent by weight of vinyl chloride.

The most direct method of cosolvent removal is by azeotropic distillation of the tert-butyl alcohol. The tert-butanol can be recovered as the water-alcohol azeotrope (~ 88 percent alcohol), with the resulting decrease in volume being made up with water. Thus, from a normal preparation of a 60 IBOMA/40 MMA emulsion copolymer, about 97 percent of the tert-butanol is recovered under the following optimum conditions: Pot temperature − 66° C., head temperature − 56° C., and pressure − 200 mg (Hg).

An alternative cosolvent removal method is precipitation by a salt solution, such as calcium chloride or aluminum sulfate. Thus, when a normal 50 IBOMA/50 MMA dispersion is precipitated in a 2 percent aqueous $CaCl_2$ solution, which is maintained at 90°–95 C., t-butanol and its water azeotrope can be observed refluxing near the exit port where it vents. No adverse effect on measured copolymer properties is observed.

As noted above, the copolymer when stripped of t-butyl alcohol serves effectively as a PVC processing aid. More specifically, when used in certain proportions as specified in Table I, the distortion temperature of the PVC may be raised. In application, the practical service temperature of the thermoplastic bodies is dictated by the softening temperature of the thermoplastic material, or by its heat distortion temperature (HDT), a term denoting the lowest temperature at which a material being tested, of specific dimensions, yields a specified distance under a specified loading. For example, the heat distortion temperature of polyvinyl chloride at 264 p.s.i. loading is about 75° C., a temperature which is so low that it prevents the material from finding use in many applications, for example, in hot-fill food packaging applications, or in applications involving sterilization temperatures approximating that of boiling water. It is thus apparent that there is a great need for an additive which will both aid the processing and heat-distortion characteristics of rigid polyvinyl chloride resins.

The characteristics of acrylic-modified polyvinyl chloride resin compositions of the present invention can be observed by inspection of Table I below wherein the ratios of percentages used are based on weight.

TABLE I

| Composition | HDT°C. (264 p.s.i.) |
|---|---|
| a. PVC without copolymer additive | 75 |
| b. 10% (IBOMA/MMA 60/40 copol.); 90% PVC | 79 |
| c. 30% (IBOMA/MMA 60/40 copol.); 70% PVC | 85 |
| d. 50% (IBOMA/MMA 60/40 copol.); 50% PVC | 98–100 |
| e. 50% (IBOMA/MMA /EA 60/38/2 copol.); 50% PVC | 100–102 |
| f. 50% (IBOMA/MMA /EA 40/58/2 copol.); 50% PVC | 96 |
| g. 50% (IBOMA/MMA 50/60 copol.); 50% PVC | 95 |

Other cosolvents that may be used include methyl ethyl ketone, acetic acid, methyl isobutyl ketone, sec-butanol, n-butanol, isopropyl alcohol, tert-amyl alcohol and mixtures thereof. Numerous other variations and modifications in the invention as illustrated in the specific examples will be apparent to those skilled in the art, and hence it is not intended that the invention be limited to the examples but only as required by the spirit and scope of the appended claims.

We claim:

1. The process for cosolvent emulsion copolymerization which comprises charging methyl methacrylate, water-insoluble monomeric bicyclic methacrylate having such hydrophilicity that at least 30 ml. of water can be added to a solution of one gram of the bicyclic methacrylate in 80 grams of absolute methanol before turbidity or phase separation occurs, the monomeric methacrylates being present in amounts in the range of about 30 to 70 parts by weight relative to each other, and a free radical initiator to an aqueous medium containing 7 to 25 percent by weight of t-butyl alcohol in a suitable reaction vessel, then copolymerizing the monomeric methacrylates, at a temperature from room temperature to about 80° − 95° C., and agitating the resulting dispersion during polymerization.

2. The process of claim 1 wherein the initiator is a mixture consisting of cumene hydroperoxide and sodium formaldehyde sulfoxylate.

3. The process of claim 1 which further comprises charging an anionic or nonionic emulsifier to the aqueous medium.

4. The process of claim 1 which further comprises removing oxygen from the aqueous system prior to and/or during initiation.

5. The process of claim 1 wherein a chain transfer agent is present.

6. The process of claim 1 wherein the bicyclic methacrylate monomer is isobornyl methacrylate.

7. The process of claim 1 wherein the monomeric material includes up to 10 percent by weight, based on the total monomer weight, of another copolymerizable ethylenically unsaturated monomer having a group of the formula

8. The process of claim 1 wherein the monomeric material contains up to 10 percent by weight of ethyl acrylate.

9. The process of claim 1 wherein the monomeric material includes 1 to 5 percent by weight of a monomer selected from ethylthioethyl methacrylate, acrylamide, methacrylamide, N-methylol-acrylamide, acrylic acid, methacrylic acid, and itaconic acid.

10. The process of claim 1 wherein the monomeric material includes 1 to 5 percent by weight of a monomer selected from ethylthioethyl methacrylate, acrylamide, methacrylamide, N-methylol-acrylamide, acrylic acid, methacrylic acid, and itaconic acid and up to 10 percent by weight, based on the total monomer weight, of another copolymerizable ethylenically unsaturated monomer having a group of the formula

* * * * *